US012568295B2

(12) United States Patent
Ohlgren

(10) Patent No.: US 12,568,295 B2
(45) Date of Patent: Mar. 3, 2026

(54) CONTROL SYSTEM FOR OPTICAL ZOOM AND FOCUS FOR MINIATURE CAMERA MODULES

(71) Applicant: Acuvi AB, Uppsala (SE)

(72) Inventor: Håkan Ohlgren, Vendelsö (SE)

(73) Assignee: Acuvi AB, Uppsala (SE)

( * ) Notice: Subject to any disclaimer, the term of this patent is extended or adjusted under 35 U.S.C. 154(b) by 281 days.

(21) Appl. No.: 18/563,652

(22) PCT Filed: May 25, 2022

(86) PCT No.: PCT/SE2022/050504
§ 371 (c)(1),
(2) Date: Apr. 24, 2024

(87) PCT Pub. No.: WO2022/250600
PCT Pub. Date: Dec. 1, 2022

(65) Prior Publication Data
US 2025/0056108 A1 Feb. 13, 2025

(30) Foreign Application Priority Data

May 26, 2021 (SE) .................................... 2150664-7

(51) Int. Cl.
*H04N 23/55* (2023.01)
*G02B 13/00* (2006.01)
(Continued)

(52) U.S. Cl.
CPC ........... *H04N 23/55* (2023.01); *G02B 13/009* (2013.01); *G03B 3/02* (2013.01); *H04N 23/67* (2023.01); *H04N 23/69* (2023.01); *G03B 30/00* (2021.01)

(58) Field of Classification Search
CPC ........ H04N 23/55; H04N 23/67; H04N 23/69; G02B 13/009; G02B 7/10; G03B 3/02; G03B 30/00; G03B 3/00; G03B 5/00
See application file for complete search history.

(56) References Cited

U.S. PATENT DOCUMENTS 5,369,461 A 11/1994 Hirasawa
6,055,378 A 4/2000 Oono
(Continued)

FOREIGN PATENT DOCUMENTS

EP 2423725 2/2012
JP 2004198828 A 7/2004
(Continued)

OTHER PUBLICATIONS

International Search Report and Written Opinion for PCT/EP2022/050504 which is a parent application to the instant application, dated Jun. 22, 2022; 12 pages.
(Continued)

*Primary Examiner* — Gevell V Selby
(74) *Attorney, Agent, or Firm* — Harness, Dickey & Pierce, P.L.C.; Anthony G. Fussner

(57) ABSTRACT

A method for driving an optical lens system having a first and a second group of optical lenses movable along a linear path parallel to an optical axis by a first and second motor, respectively, and a drive unit, comprises reading (S2, S4) of a present position of the groups and communicating (S6) it to the drive unit. In the drive unit, a command representing a requested optical zoom degree and/or a requested focusing distance is received (S10). Requested positions of the groups, corresponding to the received command, are deduced (S20) by utilizing predetermined lens positioning data available in the drive unit. The predetermined lens positioning data represents positions of the groups causing different combinations of optical zoom degree and focusing
(Continued)

distance. The motors are driven (S30, S32) to move the groups to the respective requested positions. The driving comprises applying (S31, S33) of voltage signals over electromechanical materials.

27 Claims, 10 Drawing Sheets

(51) Int. Cl.

| | |
|---|---|
| *G03B 3/02* | (2021.01) |
| *G03B 30/00* | (2021.01) |
| *H04N 23/67* | (2023.01) |
| *H04N 23/69* | (2023.01) |

(56) References Cited

U.S. PATENT DOCUMENTS

| | | | |
|---|---|---|---|
| 6,215,605 | B1 | 4/2001 | Kuwana et al. |
| 6,268,967 | B1 | 7/2001 | Kubo |
| 2006/0203119 | A1 | 9/2006 | Masuda |
| 2009/0161232 | A1 | 6/2009 | Iwasaki |
| 2009/0279187 | A1 | 11/2009 | Tsai |
| 2010/0165479 | A1 | 7/2010 | Ishikawa |
| 2012/0229628 | A1 | 9/2012 | Ishiyama et al. |
| 2013/0308039 | A1* | 11/2013 | Uchiyama ............ H04N 23/663 |
| | | | 348/345 |
| 2017/0031128 | A1 | 2/2017 | Liu |
| 2021/0243422 | A1* | 8/2021 | Hayasaka .............. H04N 23/67 |
| 2021/0250508 | A1* | 8/2021 | Fu ......................... H04N 23/687 |

FOREIGN PATENT DOCUMENTS

| | | |
|---|---|---|
| KR | 20090112770 A | 10/2009 |
| WO | WO 2021115118 | 6/2021 |

OTHER PUBLICATIONS

Swedish Search Report for SE2150664-7 which is a parent application to the instant application; dated Jan. 25, 2022; 4 pages.
International Search Report and Written Opinion for PCT/EP2022/050504 which is a parent application to the instant application. dated Jun. 22, 2022.
Swedish Search Report for SE2150664-7 which is a parent application to the instant application; dated Jan. 25, 2022.
Extended European Search Report for EP22811737.0 that claims priority to the same parent application as the instant application; dated Jun. 26, 2025; 13 pages.

* cited by examiner

DEDUCE REQUESTED POSITIONS UTILIZING PREDETERMINED LENS POSITIONING DATA ⌇S20

DETERMINE PRESENT FOCUSING DISTANCE S21

DETERMINE REQUESTED POSITIONS OF 1ST & 2ND GROUP OF LENSES CORRESPONDING TO REQUESTED OPTICAL ZOOM DEGREE AND PRESENT FOCUSING DISTANCE S22

POSITION 2

100

120

121

109

POSITION 1

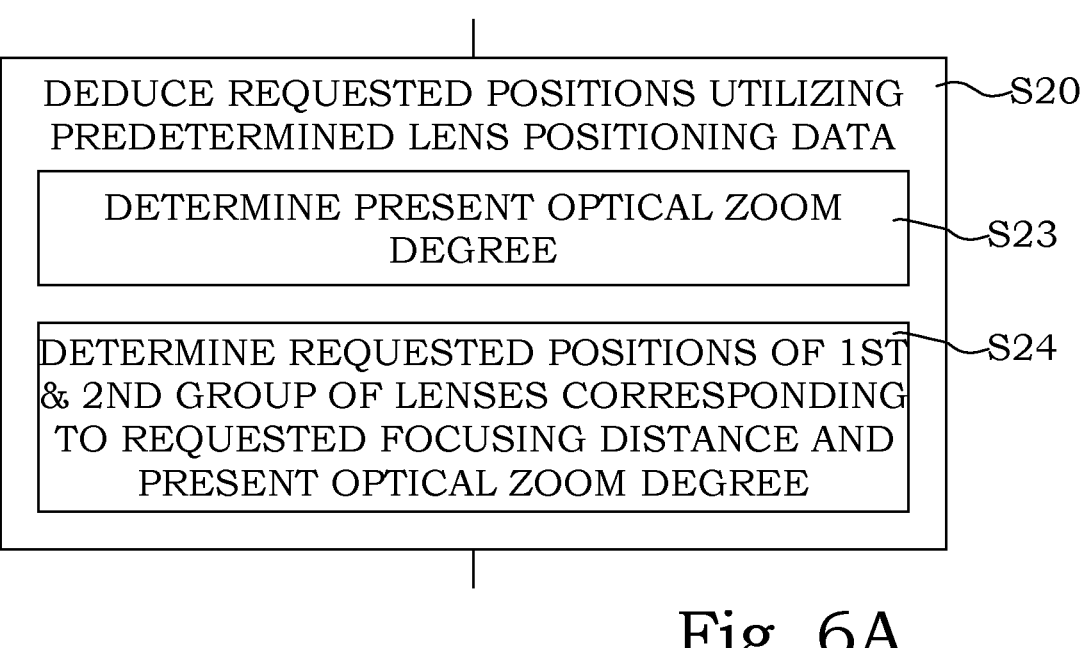
DEDUCE REQUESTED POSITIONS UTILIZING PREDETERMINED LENS POSITIONING DATA   S20
DETERMINE PRESENT OPTICAL ZOOM DEGREE   S23
DETERMINE REQUESTED POSITIONS OF 1ST & 2ND GROUP OF LENSES CORRESPONDING TO REQUESTED FOCUSING DISTANCE AND PRESENT OPTICAL ZOOM DEGREE   S24
Fig. 6A
Fig. 6B
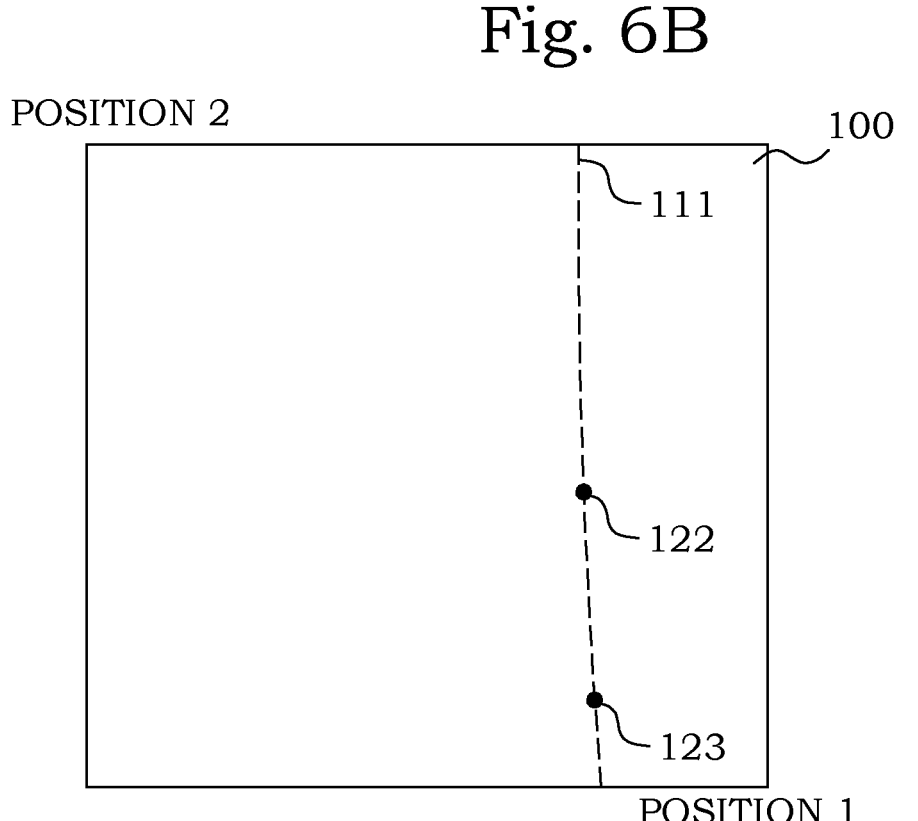
POSITION 2
100
111
122
123
POSITION 1

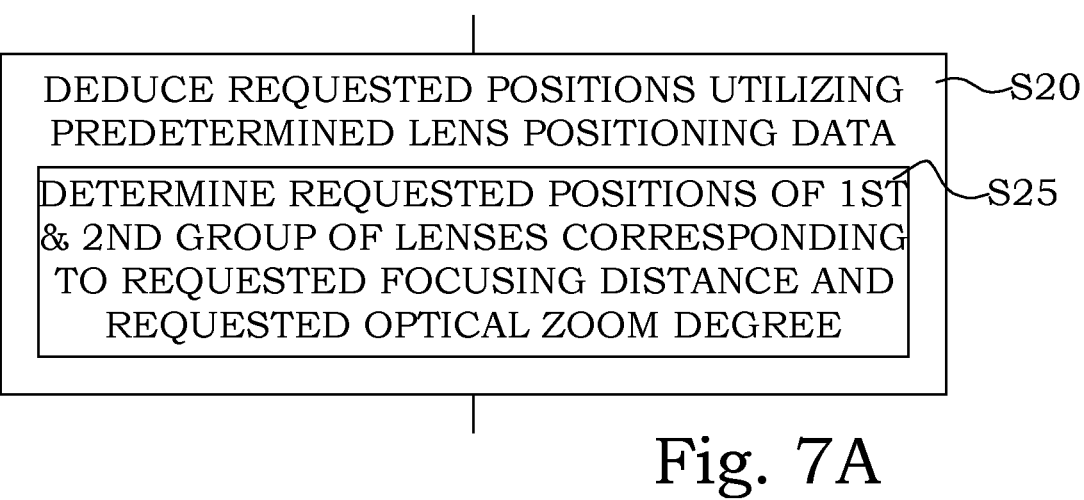
Fig. 7A
Fig. 7B
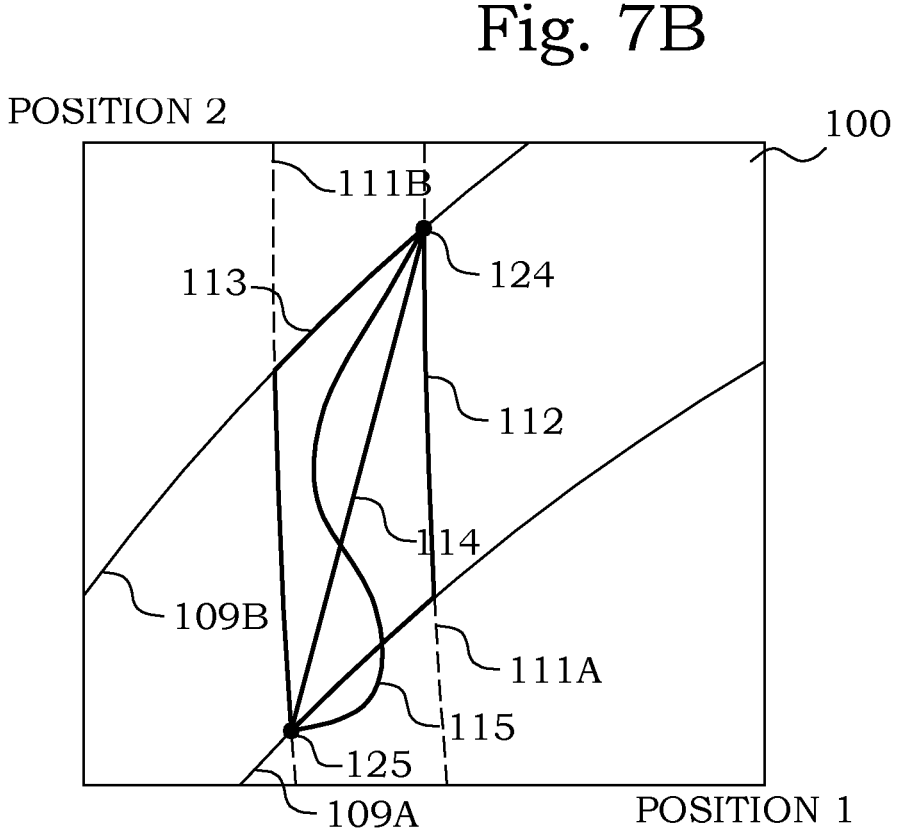

CONTROL SYSTEM FOR OPTICAL ZOOM AND FOCUS FOR MINIATURE CAMERA MODULES

This patent application is a U.S. national stage filing under 35 US.C. § 371 of PCT International Application No. PCT/SE2022/050504 filed May 25, 2022 (published as WO 2022/250600 on Dec. 1, 2022), which claims priority to and the benefit of Swedish Application No. 2150664-7 filed May 26, 2021. The entire contents of these applications are incorporated herein by reference.

TECHNICAL FIELD

The present technology relates in general to miniature lens systems and in particular to devices and methods for optical zoom and focusing in miniature camera modules.

BACKGROUND

For many lens systems, e.g. comprised in different types of cameras, features such as autofocus (AF) and optical zoom (OZ) are applied since many years. These two features are possible to obtain using multiple lenses combined in two groups of optical lenses movable along a common optical axis. Focusing is ideally achieved by moving the two groups relative each other. Optical zooming is ideally achieved by moving both groups simultaneously maintaining the distance between them. Thus, if the lenses and the mechanical design are perfect, zooming should not require changing the distance between the groups. But due to different artefacts, including e.g. temperature effects on plastic lenses, there might be a need to change the intra-group distance during zooming and over the operating temperature range.

For miniature lens systems, e.g. as provided in a mobile phone or a laptop, the space for providing lens movements is very limited. A Voice Coil solution may be used for providing the movements within the miniature optical system. The traditional AF engine may be e.g. a Voice Coil where a copper wire is winded around a group of lenses, creating a coil. The group of lenses is then inserted in a holder that includes solid state magnets and a spring pushing the group of lenses towards one end state. As an electric current is driven through the coil, a magnetic field is created that will interact with the static magnetic field in the holder, counteracting the force of the spring. By adjusting the current, the group of lenses will move within in the holder to the requested positions.

Such AF motors are very difficult to calibrate so that a known current always results in a known focusing distance. There are several reasons preventing such a calibration, such as friction, wear, temperature coefficients, gravity etc.

When it comes to optical zoom, the Voice Coil motor is even less accurate due to the normally long stroke length. Due to these limitations, Voice Coil zoom motors are rather rare and are typically limited to short zoom ranges. Furthermore, having two group of lenses that need to move independently without affecting each other is very difficult, since the magnetic field from one coil may interfere with the magnetic field of the other coil. Both groups of lenses have to be moved the same distance and deviations typically results in that an additional AF procedure has to be performed.

A typical AF algorithm based on Voice Coils implements a closed loop system where the group of lenses is moved in one direction while detecting contrast and/or phase edges. This implies that there has to be a control system for the Voice Coils that also involves an image analyzer, which necessitates the AF algorithm to be implemented at a relatively high logical control level in the system controller. As optimal focus is detected, the coil current is kept for as long as the focus needs to be kept. This causes a certain power consumption that for instance during video recording becomes very relevant.

There is thus a need for improvements in the control of miniature lens systems, in particular when AF and OZ functionality is to be provided.

SUMMARY

A general object with the present technology is to provide devices and methods for AF and OZ enabling a simpler operation of optical systems.

The above object is achieved by methods and devices according to the independent claims. Preferred embodiments are defined in dependent claims.

In general words, in a first aspect, a method for driving an optical lens system is presented. The lens system is of a type comprising a first group of optical lenses movable along a linear path parallel to an optical axis of said optical lenses by a first motor, a second group of optical lenses movable along the linear path by a second motor, and a drive unit. The method comprises reading of a present position of the first group of optical lenses along the linear path and reading of a present position of the second group of optical lenses along the linear path. Signals representing the read present positions are communicated to the drive unit. In the drive unit, a command representing at least one of a requested optical zoom degree and a requested focusing distance is received. The requested optical zoom degree and the requested focusing distance may be in absolute or relative measures. In the drive unit, requested positions of the first and second groups of optical lenses, respectively, corresponding to the received command, are deduced. This is achieved by utilizing predetermined lens positioning data available in the drive unit. The predetermined lens positioning data represents positions of the first group of optical lenses and the second group of optical lenses causing different combinations of optical zoom degree and focusing distance. Initiated by the drive unit, the first motor is driven to move the first group of optical lenses from the present position of the first group of optical lenses to the requested position of the first group of optical lenses. Initiated by the drive unit, the second motor is driven, in agreement with the driving of the first motor, to move the second group of optical lenses from the present position of the second group of optical lenses to the requested position of the second group of optical lenses. The driving of the first motor and the second motor, respectively, comprises applying of voltage signals over electromechanical materials.

In a second aspect, an optical lens system comprises a first group of optical lenses, a first motor, a second group of optical lenses, a second motor, a drive unit, a first position sensor and a second position sensor. The first motor is configured to move the first group of optical lenses along a linear path. The second group of optical lenses has a same optical axis as the first group of optical lenses. The second motor is configured to move the second group of optical lenses along the linear path. The first motor and the second motor are motors driven by applying voltage signals over electromechanical materials. The drive unit is configured for operating the first motor and the second motor. The first position sensor is arranged to read a position of the first group of optical lenses along the linear path. The first position sensor is connected to the drive unit and is configured to provide readings to the drive unit. The second position sensor is arranged to read a position of the second group of optical lenses along the linear path. The second position sensor is connected to the drive unit and is configured to provide readings to the drive unit. The drive unit comprises a data storage comprising predetermined lens positioning data representing positions of the first group of optical lenses and the second group of optical lenses causing different combinations of optical zoom degree and focusing distance. The drive unit comprises a communication interface for receiving a command representing at least one of a requested optical zoom degree and a requested focusing distance. The requested optical zoom degree and the requested focusing distance may be given in absolute or relative measures. The drive unit is configured for initiating driving the first motor and the second motor to move the first group of optical lenses and the second group of optical lenses, respectively, from an original set of positions of the first group of optical lenses and the second group of optical lenses according to present readings of the first and second position sensors to a requested set of positions of the first group of optical lenses and the second group of optical lenses. The requested set of positions corresponds to the received command according to the predetermined lens positioning data.

In a third aspect, a mobile electronic equipment comprises an optical lens system according to the second aspect.

One advantage with the proposed technology is that controlled changes of autofocus and/or optical zoom can be performed by a simple high-level command to a control unit of motors. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which:

FIG. 6A is a flow diagram of part steps of another embodiment of a step of deducing requested positions;

FIG. 6B is a schematic illustration of the intended position changes according to the steps of FIG. 6A;

FIG. 7A is a flow diagram of part steps of yet another embodiment of a step of deducing requested positions;

FIG. 7B is a schematic illustration of some intended position changes according to the steps of FIG. 7A;

DETAILED DESCRIPTION

Throughout the drawings, the same reference numbers are used for similar or corresponding elements.

Figure 1:
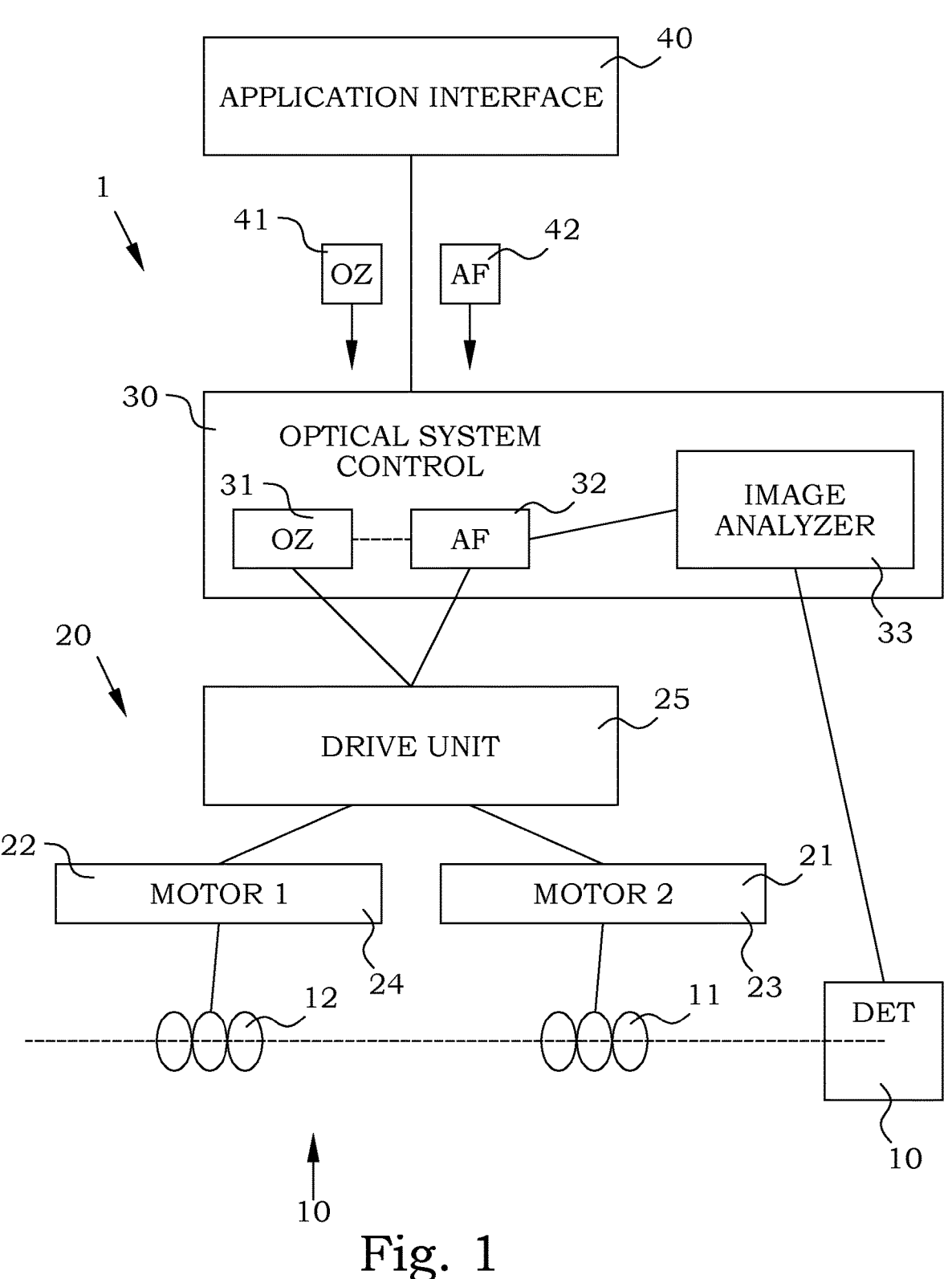
FIG. 1 is a schematic illustration of a prior art optical lens system having functionality for autofocus and optical zoom.

For a better understanding of the proposed technology, it may be useful to begin with a brief overview of the logical design of a prior art AF and OZ optical system. FIG. 1 illustrates schematically an optical lens system 1 having functionality for AF and OZ. Optical lenses 10 comprises a first group of lenses 11 and a second group of lenses 12. Depending on the exact design of the optical system, the first group of lenses 11 may comprise one or more lenses and likewise, the second group of lenses 12 may comprise one or more lenses. Different detail designs of such lens groups are well known by any person skilled in the art and is not further described.

A motor system 20 is used for motions within optical lenses 10. The first group of lenses 11 is allowed to move along an optical axis 5 by means of a first motor 21, in this example a first voice coil motor 23, and the second group of lenses 12 is allowed to move along the same optical axis 5 by means of a second motor 22, in this example a second voice coil motor 24. The motors are controlled by a motor control 25. This motor control 25 may be divided in two parts, handling one motor each, or may be integrates into one common control unit.

An optical system control 30 is used for instructing the motor control 25 how to position the first and second group of lenses 11, 12, respectively. The optical system control 30 comprises an optical zoom section 31, being adapted for supplying the motor control 25 with instructions for moving the first and second group of lenses 11, 12 together a predetermined distance. The optical system control 30 further comprises an autofocus section 32, being adapted for supplying the motor control 25 with instructions for changing a distance between the first and second group of lenses 11, 12. The autofocus section 32 comprises or has access to an image analyzer 33, in turn being connected to an image detector 15 positioned for detecting an image along the optical axis 5. The image analyzer 33 provides information about contrast and/or phase edges that can be used as feedback for successively changing the distance between the first and second group of lenses 11, 12 until focusing is achieved.

An application interface 40 is operable to provide requests regarding optical zoom 41 or requests regarding autofocus 42 from e.g. a user input or from other applications in the device to which the optical lenses 10 are attached. The requests 41, 42 are transformed by the optical system control 30 into suitable commands to the motor control 25. Due to the indefiniteness of the positioning of the voice coil motors 23, 24, an optical zoom has almost as a rule to be followed by an autofocus procedure, even though an autofocus action is not explicitly requested. An optical zoom request from the application interface 40 thereby causes a relatively complex procedure involving many parts of the total system. The different part systems therefore have to be well adapted to each other in order to give a smooth operation, and the designer of e.g. the optical system control 30 has to have deep understanding of the detailed function of the motor system 20. Such close co-design counteracts possibilities for exchanging or updating parts of the different systems without extensive redesign of the entire system.

Motors that uses shape changes of electromechanical materials caused by the application of voltage signals over the electromechanical materials are well suited to be utilized in miniature systems. Piezoelectric motors utilizing small steps or vibrations of shape-changing piezoelectric materials is the most common type of such motors. They have generally a high energy density and may therefore be mounted in very small spaces. Another advantage of such motors is that when a requested position is reached, no additional power is needed to maintain such a position.

Another useful feature of motors driven by applying voltage signals over electromechanical materials is that the positioning is very accurate and repetitive. Changes in friction, temperatures, gravity direction, wear etc. do not essentially influence the final position. This implies that by using this type of motors, a known position can always be reached. When applied to optical lens system having AF and OZ functionality, this, in turn, opens up for calibrating optical zoom and focusing distance against positions of the two groups of lenses, and as will be discussed further below, preferably also the temperature of the lenses. Each combination of optical zoom and focusing distance will correspond to a unique pair of lens group positions for a given temperature.

Figure 2:
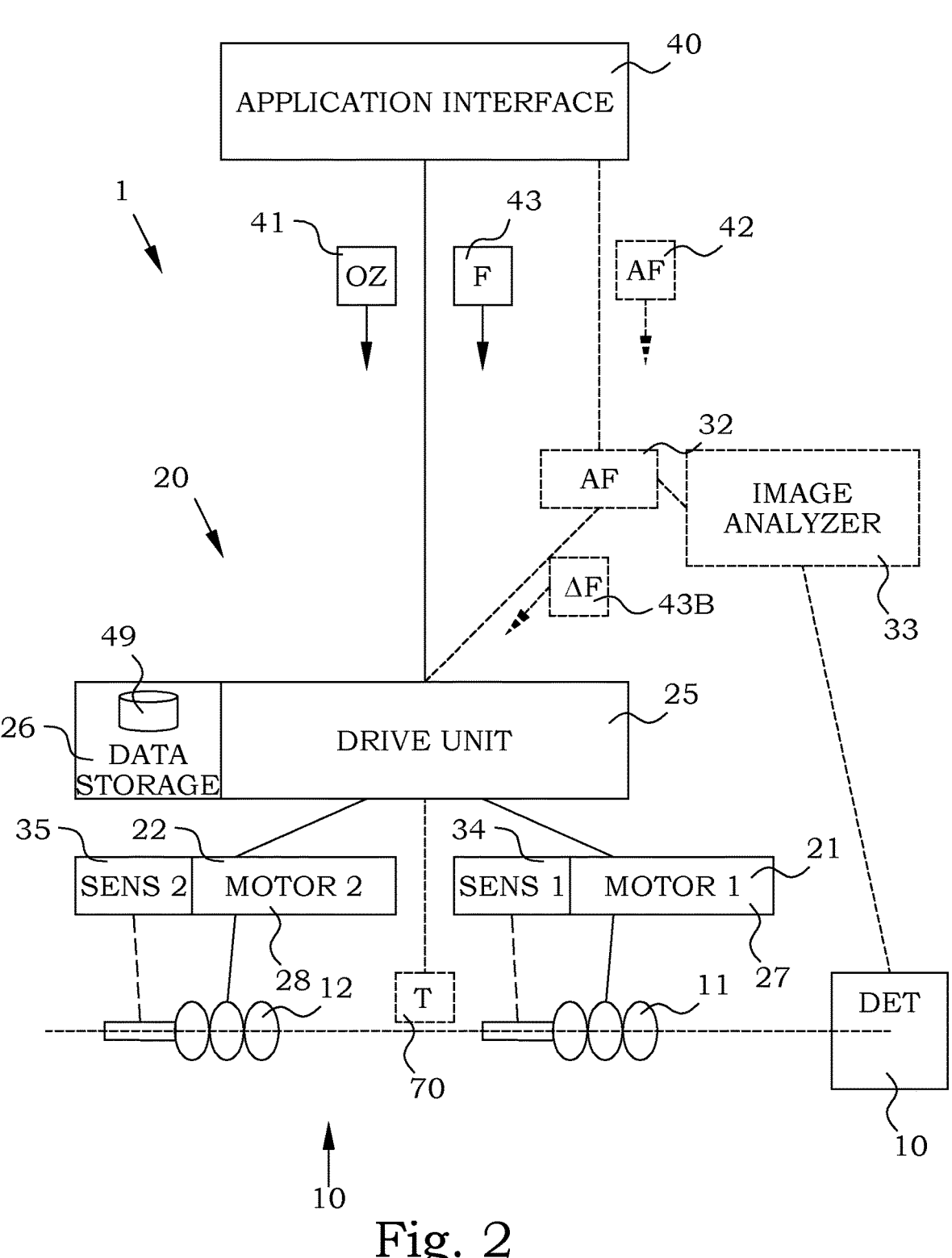
FIG. 2 is a schematic illustration of an embodiment of an optical lens system using motors driven by applying voltage signals over electromechanical materials.

FIG. 2 is a schematic illustration of an embodiment of an optical lens system 1, comprising a first group 11 of optical lenses and a second group 12 of optical lenses. The second group 12 of optical lenses has a same optical axis 5 as the first group 11 of optical lenses. A first motor 21 is configured to move the first group 11 of optical lenses along a linear path. This linear path is parallel to the optical axis 5. A second motor 22 is configured to move the second group 12 of optical lenses along the same linear path. The first motor 21 and the second motor 22 are motors 27, 28 driven by applying voltage signals over electromechanical materials. Preferably, the first motor 21 and the second motor 22 are piezoelectric motors.

A drive unit 26 is configured for operating the first motor 21 and the second motor 22. A first position sensor 34 is arranged to read a position of the first group 11 of optical lenses along the linear path. The first position sensor 34 is connected to the drive unit 26. The first position sensor 34 is configured to provide readings to the drive unit 26. Analogously, a second position sensor 35 is arranged to read a position of the second group 12 of optical lenses along the linear path. The second position sensor 35 is connected to the drive unit 26. The second position sensor 35 is configured to provide readings to the drive unit 26.

The drive unit 26 comprises a data storage 29. The data storage 29 comprises predetermined lens positioning data 49. The predetermined lens positioning data 49 represents positions of the first group 11 of optical lenses and the second group 12 of optical lenses causing different combinations of optical zoom degree and focusing distance, preferably temperature compensated. In other words, the predetermined lens positioning data 49 provides a conversion back and forth between, on one hand, pairs of positions of the first group 11 of optical lenses and the second group 12 of optical lenses and on the other hand combinations of optical zoom degree and focusing distance. By using such predetermined lens positioning data 49, a pair of positions of the first group 11 of optical lenses and the second group 12 of optical lenses can be translated into a corresponding optical zoom degree and focusing distance. Likewise, a combination of an optical zoom degree and a focusing distance can be translated into a pair of positions of the first group 11 of optical lenses and the second group 12 of optical lenses.

The drive unit 26 comprises a communication interface 45 that is configured for receiving a command. The command represents a requested optical zoom degree 41 and/or a requested focusing distance 43. These requests can be provided in absolute or relative measures. The drive unit 26 is configured for using the requests to determine a requested optical zoom degree and a requested focusing distance. This process may, depending on the content of the received requests, have to utilize knowledge of a present optical zoom degree and a present focusing distance. If absolute measures of both a requested optical zoom degree and a requested focusing distance is received, the procedure is straight forward. If the received requests are relative measures, a present optical zoom degree and a present focusing distance may have to be used for determining requested optical zoom degree and requested focusing distance in absolute terms. If either of the quantities are missing in the request, an assumption is made that this quantity should remain unchanged. Based on the determined requested optical zoom degree and requested focusing distance, the predetermined lens positioning data 49 is utilized to derive a requested set of positions of the first group 11 of optical lenses and the second group 12 of optical lenses.

The drive unit 26 is therefore configured for initiating driving the first motor 21 and the second motor 22 in order to move the first group 11 of optical lenses and the second group 12 of optical lenses, respectively. This movement starts from an original set of positions of the first group 11 of optical lenses and the second group 12 of optical lenses. This original set of positions corresponds to the present readings of the first and second position sensors 34,35. The movement ends in the requested set of positions of the first group 11 of optical lenses and the second group 12 of optical lenses. The requested set of positions corresponding, as explained above, to the received command 41, 43 according to the lens positioning data 49.

In this way, a change in optical zoom can be performed without any involvement of any autofocus function. This opens for introducing a simpler interaction directly between the application interface 40 and the drive unit 26. The application interface 40 can use data of a high conceptual level, being directly associated with the final goal of the process. At the same time, the drive unit 26 can easily interpret these high-level commands into quantities that are relevant for the accurate position control. Due to the high accuracy and repeatability of the motor operations, there is no need for any additional autofocus operation.

However, the direct interaction also admits that the focusing distance is changed in a similar way. If a user or an external application requests that the autofocus setting should be abandoned, another focusing distance can be requested directly to the drive unit 26.

There is also a possibility to define both the requested optical zoom degree 41 and the requested focusing distance 43 in the communication between the application interface 40 and the drive unit 26. In such a case, there are different options for the drive unit 26 to respond. One alternative is that the two requests can be responded to consecutively, e.g. by first changing the optical zoom and then the focusing distance or vice versa. Alternatively, both changes may be responded to simultaneously, i.e. changing both positions of the groups of optical lenses causing a simultaneous change in optical zoom degree and focusing distance. Further detailed alternative will be discussed further below.

It can be further noticed that an autofocus function still can be provided as a complement to the present ideas. A command 42 of an autofocus procedure may be provided from e.g. the application interface 40 to an autofocus section 32. This autofocus section 32 does not necessarily be integrated into the drive unit 26, even if it is possible, but may be provided as a separate application. The autofocus section 32 may, as in prior art solutions, utilize an image analyzer 33 and an image detector 15 to obtain measures of the contrast and/or phase edges. Based on this, requests of a change of focusing distance 43B can be provided to the drive unit 26 and the drive unit 26 will effectuate the request. This process is typically repeated until a good optical focus is achieved.

One additional advantage in connection with the additional autofocus functionality is that the drive unit 26 always keeps track on the actually used focusing distance. By requesting an autofocus operation and directing the camera system towards a particular object, the final result will be a setting of the two groups of optical lenses corresponding to a certain focusing distance. The drive unit 26 is informed by the first and second position sensors 34, 35 about their positions, and the predetermined, and preferably temperature compensated, lens positioning data 49 can be used to translate these positions into a measure of a focusing distance. If requested, the drive unit will then be able to communicate such a distance 44 to the application interface 40 directly or via the autofocus section 32. The optical lens system thereby functions as a distance measuring device, measuring a distance to the particular object.

Figure 3:
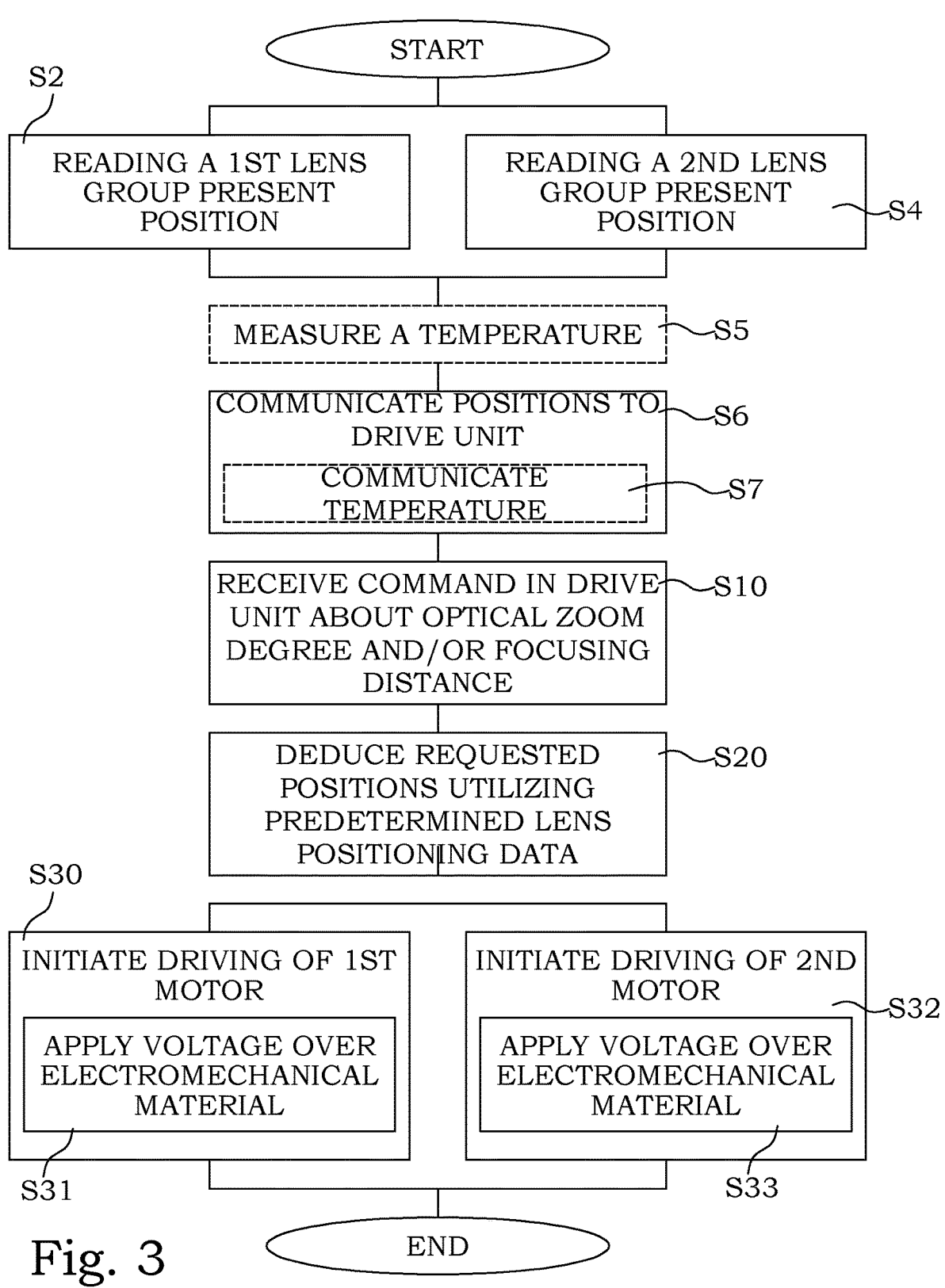
FIG. 3 is a flow diagram of steps of an embodiment of a method for driving an optical lens system.

FIG. 3 is a flow diagram of steps of an embodiment of a method for driving an optical lens system. The lens system comprises, as described above, a first group of optical lenses movable along a linear path parallel to an optical axis of said optical lenses by a first motor, a second group of optical lenses movable along the linear path by a second motor, and a drive unit. In step S2, a present position of the first group of optical lenses along the linear path is read. In step S4, a present position of the second group of optical lenses along the linear path is read. Steps S2 and S4 are illustrated to be performed in parallel, since they can be performed in any order or simultaneously. In step S6, signals representing the read present positions are communicated to the drive unit. The drive unit is now aware of the present positions of the groups of optical lenses as a start information and is ready for effectuate any received commands.

In step S10, a command representing a requested optical zoom degree and/or a requested focusing distance is received in the drive unit. The requested optical zoom degree and/or a requested focusing distance may be given in absolute or relative measures. This is the only external information that is necessary to enable the drive unit to perform the requested operations.

In step S20, requested positions of the first and second groups of optical lenses, respectively, are deduced in the drive unit. The requested positions of the first and second groups of optical lenses correspond to the received command. This is achieved by utilizing predetermined lens positioning data available in the drive unit. The predetermined lens positioning data represents positions of the first group of optical lenses and the second group of optical lenses causing different combinations of optical zoom degree and focusing distance. In other words, a transformation of the request in the form of an optical zoom degree and/or a focusing distance into requested positions is thus performed.

With requested positions available, the actual movements may be performed. In step S30, as initiated by the drive unit, the first motor is driven to move the first group of optical lenses from the present position of the first group of optical lenses to the requested position of the first group of optical lenses. This step comprises, as indicated by the part step S31, applying of voltage signals over electromechanical materials. Likewise, in step S32, as initiated by the drive unit, the second motor is driven in agreement with the driving of the first motor, to move the second group of optical lenses from the present position of the second group of optical lenses to the requested position of the second group of optical lenses. This step comprises, as indicated by the part step S33, applying of voltage signals over electromechanical materials. Steps S30 and S32 are illustrated to be performed in parallel, since they can be performed in any order or simultaneously, depending on the mode of movement that is requested.

Figure 4:
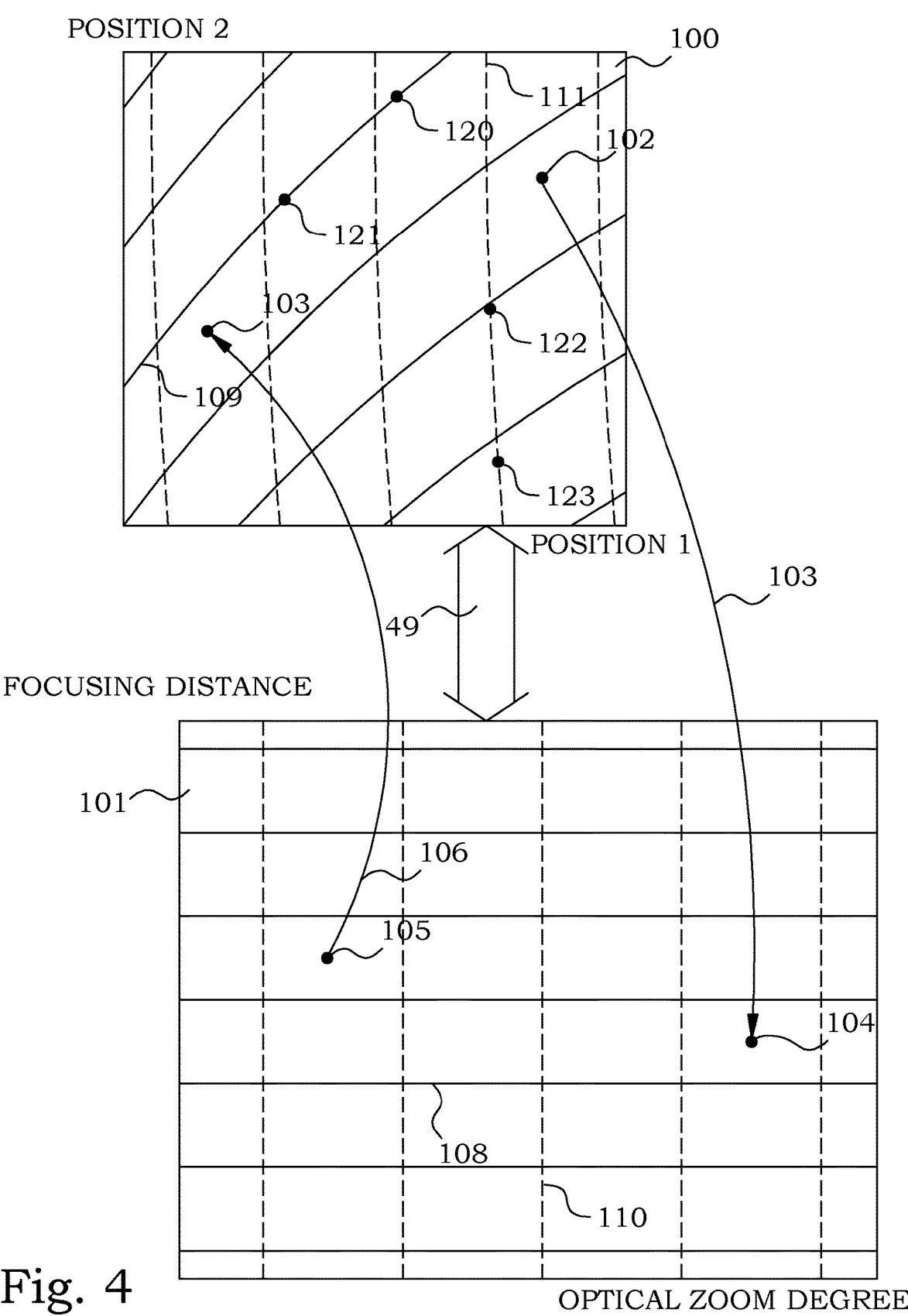
FIG. 4 is a schematic illustration of the transforming forth and back of positions to focusing distance and optical zoom degree.

FIG. 4 illustrates schematically the use of the predetermined lens positioning data 49. A two-dimensional position space 100 is defined by the positions of the two groups of optical lenses. Likewise, a two-dimensional optical property space 101 is defined by the focusing distance and the optical zoom degree. A point 102 in position space 100, corresponding to a certain first position and a certain second position can by means of the predetermined lens positioning data 49 be transformed, as indicated by the arrow 103, into a point 104 in the optical property space 101, corresponding to a certain focusing distance and a certain optical zoom degree. Also, a point 105 in the optical property space 101, corresponding to a certain focusing distance and a certain optical zoom degree, can by means of the predetermined lens positioning data 49 be transformed, as indicated by the arrow 106, into a point 107 in the position space 100, corresponding to a certain first position and a certain second position.

This one-to-one mapping means that a line 108 in the optical property space 101, representing an optical zoom action with constant focusing distance corresponds to a curve 109 in the position space 100. Depending on the actual configuration of the group of optical lenses, the curve 109 may look somewhat different. In a typical case, the curve 109 is close to a straight line at 45 degrees inclination. However, due to imperfections in the optical system, e.g. caused by the operating temperature range, or particular design features, the curve 109 may deviate from such an "ideal" curve, as indicated in the position space 100. This is the reason why a prior art optical zoom operation typically is followed by an autofocus operation.

Likewise, a line 110 in the optical property space 101, representing a focusing action with optical zoom degree corresponds to a curve 111 in the position space 100. This curve 111 is typically close to a vertical line, but may also deviate from this depending on the actual design of the group of optical lenses.

Since the positioning using e.g. motors based on piezoelectric properties is accurate and repetitive, a "calibration" between the two spaces 100, 101 can be performed and relied on as the predetermined lens positioning data 49. This can easily be retrieved in a test rig, where optical zoom degree, focusing distance and the positions of the two groups of optical lenses are measures very accurately. If the accuracy of the mounting of the groups of lenses is accurate enough, a general calibration can be used for all devices using the same lens design and material. If the mounting accuracy is lower, calibration or at least adjustment of the calibration may have to be performed for each individual device.

The predetermined lens positioning data 49 and the use of it for transforming points and/or curves between the spaces 100, 101, may be of very different kinds. Two-dimensional lookup tables, possibly with interpolation functionality may be used. The predetermined lens positioning data 49 may also be provided as two-dimensional function definitions. Such detailed choice of transformation operations is, as such, well known by any person skilled in the art and is therefore not further discussed. The request concerning the present technology is just that the predetermined lens positioning data 49 should provide a possibility of transformations forth and back between the two spaces 100, 101.

Figures 5A, 5B:
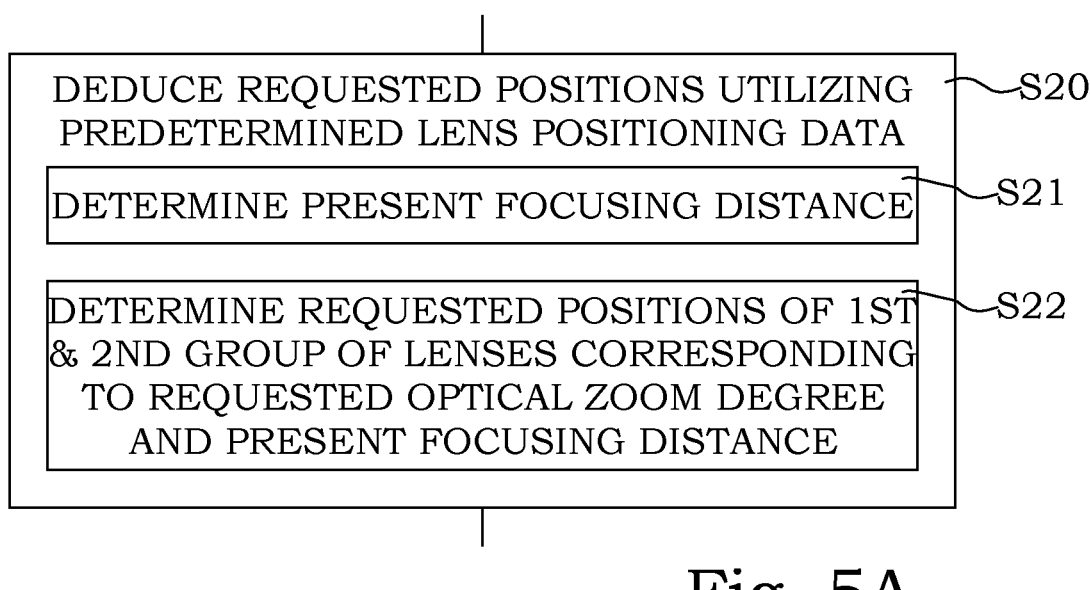
FIG. 5A is a flow diagram of part steps of an embodiment of a step of deducing requested positions.
FIG. 5B is a schematic illustration of the intended position changes according to the steps of FIG. 5A.

FIG. 5A illustrates an embodiment of the step S20. In this embodiment, the command received by the control unit is postulated to only comprising a requested optical zoom degree. In such a case, the step S20 of deducing requested positions of the first and second groups of optical lenses, respectively, comprises two sub-steps. In step S21, a present focusing distance is determined by comparing the read present positions with the predetermined lens positioning data. In step 522, the requested positions of the first and second groups of optical lenses, respectively, are determined as positions corresponding to the requested optical zoom degree and the present focusing distance according to the predetermined lens positioning data.

The path between the present positions of the first and second groups of optical lenses and the requested positions of the first and second groups of optical lenses can in principle be selected in many different ways. However, since no change in focusing distance is commanded, it is preferred to keep the focusing distance as constant as possible. Such a situation is illustrated in FIG. 5B, where a path between a present point 120 and a requested point 121 in the position space 100 is controlled to follow the line 109, representing a constant focusing distance. In other words, the steps of driving the first motor and driving the second motor are preferably performed under a constraint of keeping the focusing distance constant according to the predetermined lens positioning data.

As seen in an apparatus point of view, when the command only comprises a requested optical zoom degree, the drive unit is preferably configured to determine a present focusing distance by comparing the read present positions with the predetermined lens positioning data and to determine the requested positions of the first and second groups of optical lenses, respectively, as positions corresponding to the requested optical zoom degree and the present focusing distance according to the predetermined lens positioning data. Preferably, the drive unit is configured for performing the initiating of driving the first motor and the initiating of driving the second motor under a constraint of keeping the focusing distance constant according to the predetermined lens positioning data.

FIG. 6A illustrates an embodiment of the step S20. In this embodiment, the command received by the control unit is postulated to only comprising a requested focusing distance. In such a case, the step S20 of deducing requested positions of the first and second groups of optical lenses, respectively, comprises two sub-steps. In step S23, a present optical zoom degree is determined by comparing the read present positions with the predetermined lens positioning data. In step 524, the requested positions of the first and second groups of optical lenses, respectively, are determined as positions corresponding to the present optical zoom degree and the requested focusing distance according to the predetermined lens positioning data.

Also in this embodiment, the path between the present positions of the first and second groups of optical lenses and the requested positions of the first and second groups of optical lenses can in principle be selected in many different ways. However, since no change in optical zoom degree is commanded, it is preferred to keep the optical zoom degree as constant as possible. Such a situation is illustrated in FIG. 6B, where a path between a present point 122 and a requested point 123 in the position space 100 is controlled to follow the line 111, representing a constant optical zoom degree. In other words, the steps of driving the first motor and driving the second motor are preferably performed under a constraint of keeping the optical zoom degree constant according to the predetermined lens positioning data.

As seen in an apparatus point of view, when the command only comprises a requested focusing distance, the drive unit is preferably configured to determine a present optical zoom degree by comparing the read present positions with the predetermined lens positioning data and to determine the requested positions of the first and second groups of optical lenses, respectively, as positions corresponding to the present optical zoom degree and the requested focusing distance according to the predetermined lens positioning data. Preferably, the drive unit is configured for performing the initiating of driving the first motor and the initiating of driving the second motor under a constraint of keeping the optical zoom degree constant according to the predetermined lens positioning data.

FIG. 7A illustrates an embodiment of the step S20. In this embodiment, the command received by the control unit is postulated to comprise both a requested focusing distance and a requested optical zoom degree. In such a case, the step S20 of deducing requested positions of the first and second groups of optical lenses, respectively, comprises a sub-step. In step S25, the requested positions of the first and second groups of optical lenses, respectively, are determined as positions corresponding to the requested optical zoom degree and the requested focusing distance according to the predetermined lens positioning data.

Also in this embodiment, the path between the present positions of the first and second groups of optical lenses and the requested positions of the first and second groups of optical lenses can in principle be selected in many different ways. In FIG. 7B, where a present point 124 and a requested point 125 in the position space 100 are defined. The path of travelling between these two points can be selected in many different ways. A first path 112 selects an approach of first adapting the focus distance by first following line 111A, representing a constant optical zoom degree, and then adapting the optical zoom degree by thereafter following the line 109A representing a constant focusing distance. A second, alternative, path 113 instead selects an approach of first adapting the optical zoom degree by following the line 109B representing a constant focusing distance, and then adapting the focusing distance by thereafter following the line 111B representing a constant optical zoom degree.

A third, further alternative, path 114, an approach of simultaneous change of both the optical zoom degree and the focusing distance is used. This path 114 selects the shortest way in the space 100, i.e. to change both positions with constant speeds so that the requested optical zoom degree and focusing distance is reached simultaneously. A fourth, further alternative, path 115 is also illustrated. From this, any person skilled in the art realizes that any path starting at the present point 124 and ending at the requested point 125 may serve the purpose.

If there are any particular requests from the user or application that the image should behave in any particular manner and therefore prefer any particular path, such additional information may be comprised in the command from the application interface. In other words, the command may additionally comprise information concerning a requested manner in which the changes in optical zoom degree and focusing distance should be performed, whereby the steps of driving the first motor and driving the second motor are performed under a constraint of changing the optical zoom degree and the focusing distance according to the requested manner.

As seen in an apparatus point of view, when the command comprises both a requested focusing distance and a requested optical zoom degree, the drive unit is preferably configured for determining the requested positions of the first and second groups of optical lenses, respectively, as positions corresponding to the requested optical zoom degree and the requested focusing distance according to the predetermined lens positioning data. Preferably, if the command additionally comprises information concerning a requested manner in which the changes in optical zoom degree and focusing distance should be performed, the drive unit is configured for initiating driving of the first motor and initiating driving of the second motor under a constraint of changing the optical zoom degree and the focusing distance according to the requested manner.

As mentioned above, the use of e.g. motors based on piezoelectric technology typically has a very accurate and repetitive positioning. However, the actual mounting of the group of optical lenses may in certain application introduce minor temperature dependencies. If the optical system is to be operated within a narrow temperature range, such temperature dependencies are typically negligible. However, if the operating temperature may differ considerably, temperature effects may be noticeable. The present technology is, however, preferably also capable of compensating for such behaviours.

In one embodiment, as indicated in FIG. 2, the optical lens system further comprises a temperature sensor 70. This temperature sensor 70 is configured for measuring a temperature representative for the first and second groups 11, 12 of optical lenses. The temperature sensor 70 is connected to the drive unit 62 for enabling communication of signals representing the measured temperature. The predetermined lens positioning data 49 does in such an embodiment comprise data representing different temperatures. The drive unit 26 is then configured for using a requested set of positions corresponding to the received command according to lens positioning data associated with the measured temperature.

If returning to FIG. 3, there may be some additional steps present for achieving this compensation. In this embodiment, there is a step S5, in which a temperature representative for the first and second groups of optical lenses is measured. In step S7, signals representing the measured temperature is communicated to the drive unit. Furthermore, in step S20 of deducing requested positions of the first and second groups of optical lenses, this deduction is based on predetermined lens positioning data associated with the measured temperature.

As briefly mentioned above, there may be occasions where a user or application operating the optical system is not aware of the actually used focusing distance. This may e.g. be the case if an autofocus operation is performed. This may also be the case when the command from the application interface only comprises relative measures of focusing distance changes. If the application/user does not keep track on the absolute focusing distance measure, this distance may be unknown for the application/user. However, this information is always possible to deduce from the motor system. By using the information about the present positions of the first and second groups of optical lenses, the control unit may use the predetermined lens positioning data 49 to obtain a measure of a present focusing distance. Such measure can be made available for the application/user. The same is valid for a present optical zoom degree.

In one embodiment, the method for driving an optical lens system comprises the further step S40 of sending, from the drive unit, information about at least one of a present focusing distance and a present optical zoom degree to a control unit.

In an apparatus view, in the communication interface, the optical lens system is further configured for sending information about at least one of a present focusing distance and a present optical zoom degree to a control unit.

Figure 8:
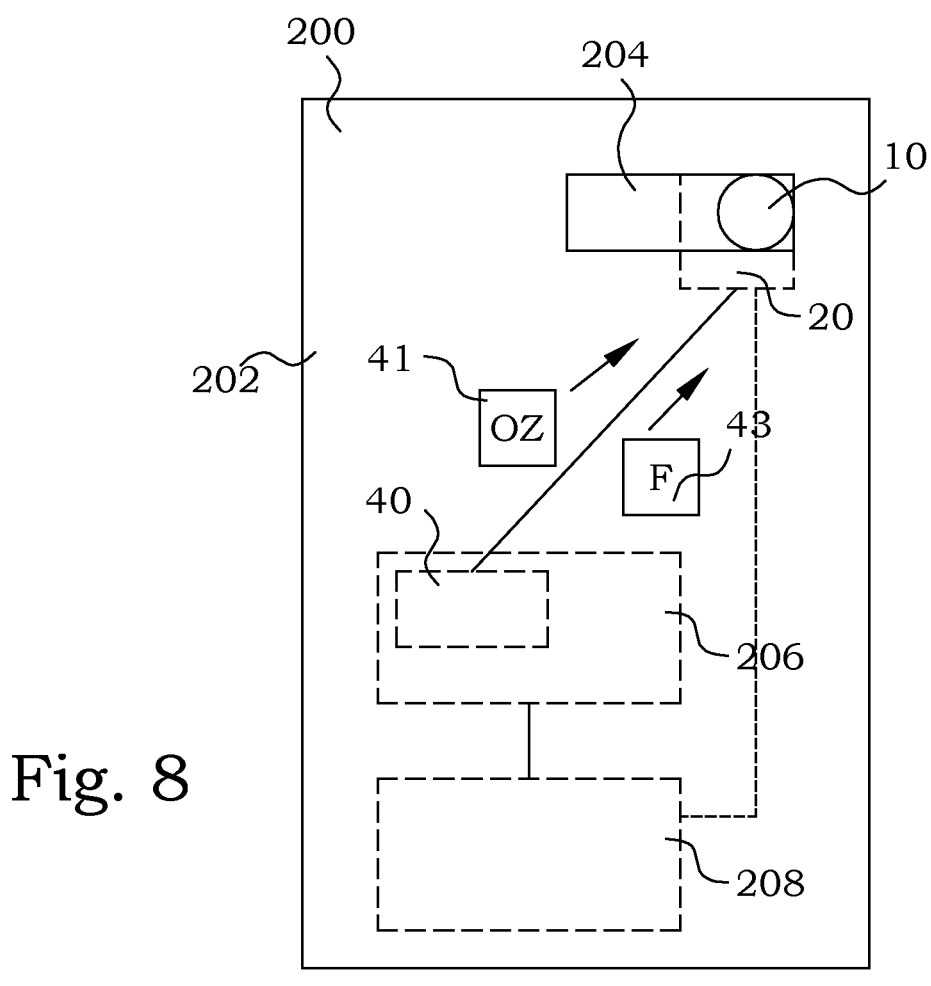
FIG. 8 is a schematical illustration of an embodiment of a mobile electronic equipment.

As discussed above, the present technology is particularly well suited to be applied to small or miniature optical lens systems. A typical application is cameras on different mobile electronic equipment, such as mobile phones or laptops. FIG. 8 illustrates schematically a mobile electronic equipment 200, in this particular case a mobile phone 202, having a camera 204 with an optical lens system 1. This optical lens system 1 is preferably arranged according to the present description. The mobile electronic equipment 200 comprises an application processor 206 configured to supply the drive unit 26, via the application interface 40, with the command 41, 43 representing at least one of a requested optical zoom degree and a requested focusing distance.

The drive unit 26 may also be an application processor of the mobile electronic equipment 200.

In the case where the communication interface is further configured for sending information about a present focusing distance and/or a present optical zoom degree, the receiving control unit could be the application processor 206. The application processor can then display this information in a display means 208 configured for displaying the information about a present focusing distance and/or a present optical zoom degree. Alternatively, the control unit may be a separate display means provided within the mobile electronic equipment.

Figure 9:
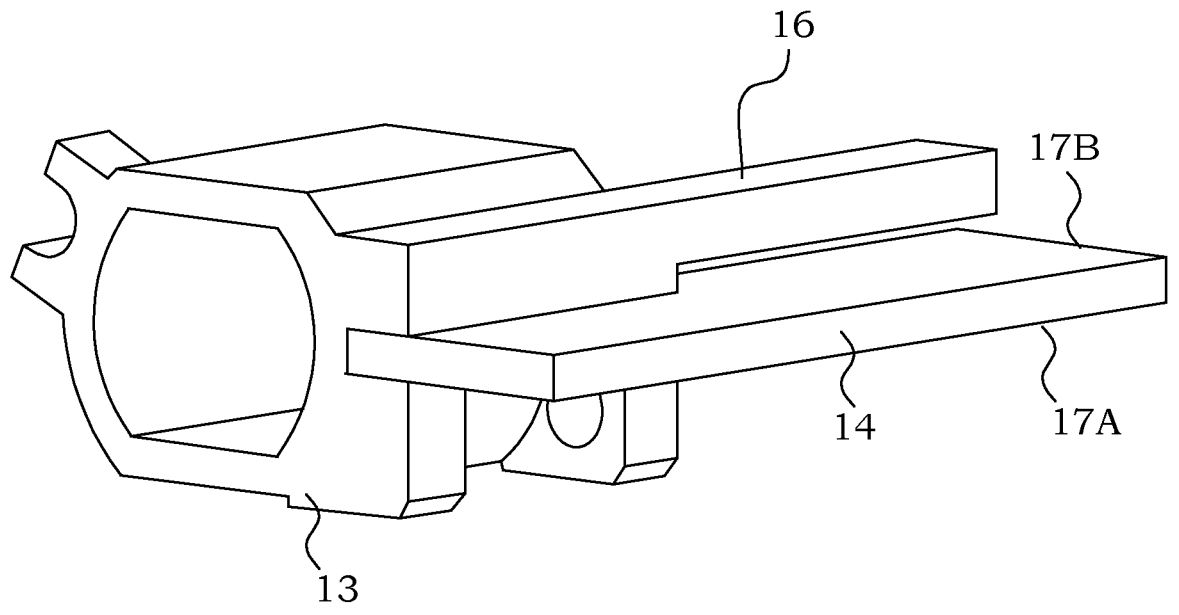
FIG. 9 is a schematic illustration of an embodiment of a lens holder.

FIG. 9 illustrates schematically parts of an embodiment of an optical lens system. A lens holder 13 is adapted for mechanically holding one or several optical lenses (not shown). The lens holder 13 is in turn attached to a drive rod 14 with two flat surfaces 17A and 17B, intended to be driven by respective actuating parts of a piezoelectric motor. This drive rod 14 is thus adapted to be used in a twin-actuator set-up, with one actuator operating against each flat surface 17A and 17B, driving the drive rod 14 and thereby the lens holder and optical lenses mounted therein along the optical axis. However, alternatively, the drive rod 14 may also be driven by one single actuator by driving against one of the surfaces 17A and 17B and having a bearing arrangement providing a counteracting action. The lens holder 13 also comprises a sensor scale 16. This sensor scale can be of different types, adapted to the type of position sensor that is used in the system.

Figure 10:
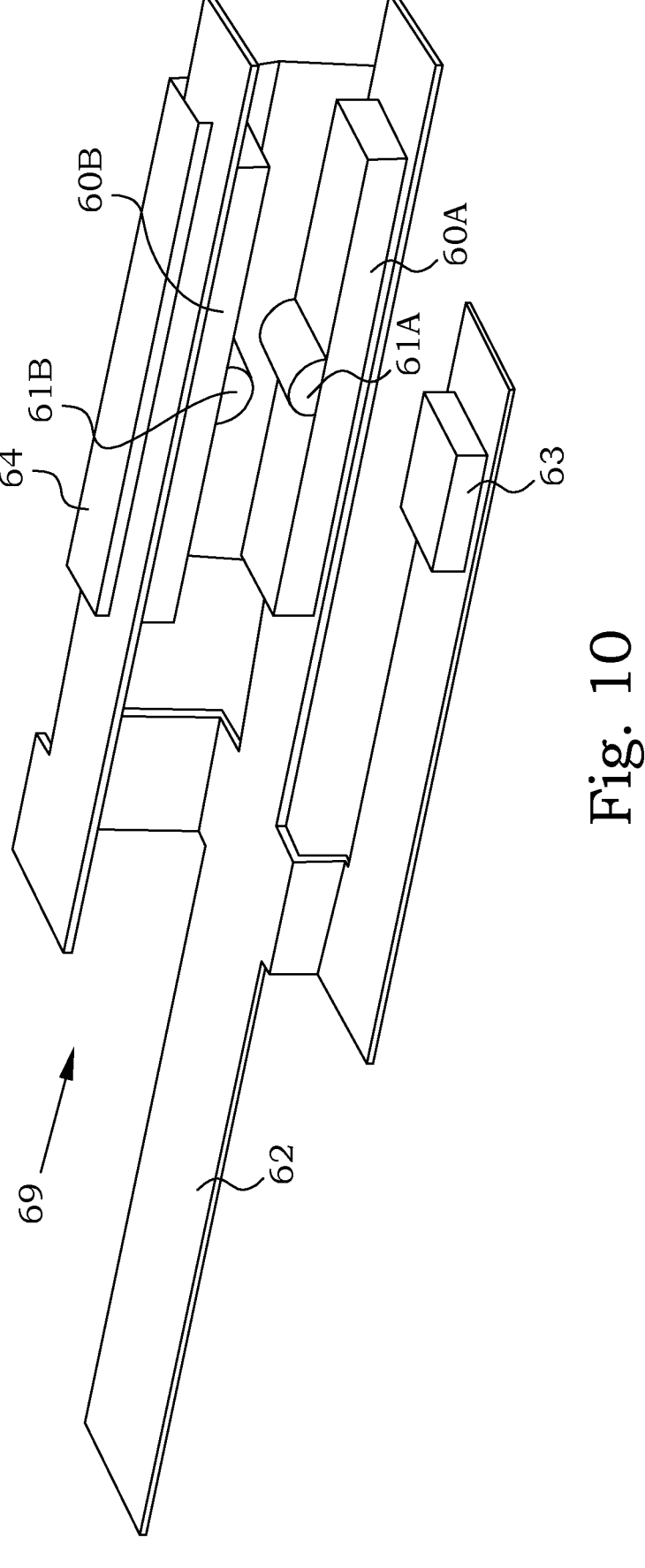
FIG. 10 is a schematic illustration of an embodiment of an actuator.

FIG. 10 illustrates schematically parts of an actuator 69 of an embodiment of an optical lens system, which may cooperate with the lens holder parts illustrated in FIG. 9. This figure shows two piezo elements 60A, 60B, mounted on a flex cable board 62. The piezo elements 60A and 60B are excitable by voltage signals to cause a vibration within the piezo elements 60A, 60B having strokes in the vertical direction in the figure. Each piezo element 60A, 60B, is provided with a respective drive pad 61A, 61B, provided for establishing the contact with the flat surfaces of the drive rod of the lens holder (see FIG. 9). When the vibration of the piezo elements 60A, 60B is excited, the tips of the drive pads 61A, 61B will perform an essentially elliptical motion, which can be used for causing a relative displacement between the drive pads 61A, 61B and the drive rod. The two piezo elements are held together by a spring 64, pushing parts of the flex cable board 62 together.

This type of driving, using piezo elements, is, as such, well known since many years, and the person skilled in the art is well aware of how to use such setups.

A sensor 63 is attached to the flex cable board 62. When mounted together with the lens holder, the sensor 63 will follow the relative motion of the actuator and holder and will move in a vicinity of the sensor scale of the lens holder. Since the flex cable board 62 is fixed relative a housing of the optical lens system, the sensor 63 is enables to determine the position of the group of lenses that is held by the lens holder. The reading from the sensor 63 can easily be used to obtain a feed-back operation of the motor. A driving of the motor is then performed until the required position is reached.

An analogue situation is also present for the other group of optical lenses, having its lens holder an actuator system.

In other words, the drive unit is configured for initiating the driving of the first motor and initiating the driving of the second motor with a feed-back operation based on communicated signals from the first and second position sensors representing successive read present positions.

In a method view, the steps of driving the first motor and driving the second motor comprises feed-back operation based on communicated signals representing successive read present positions.

Figure 11:
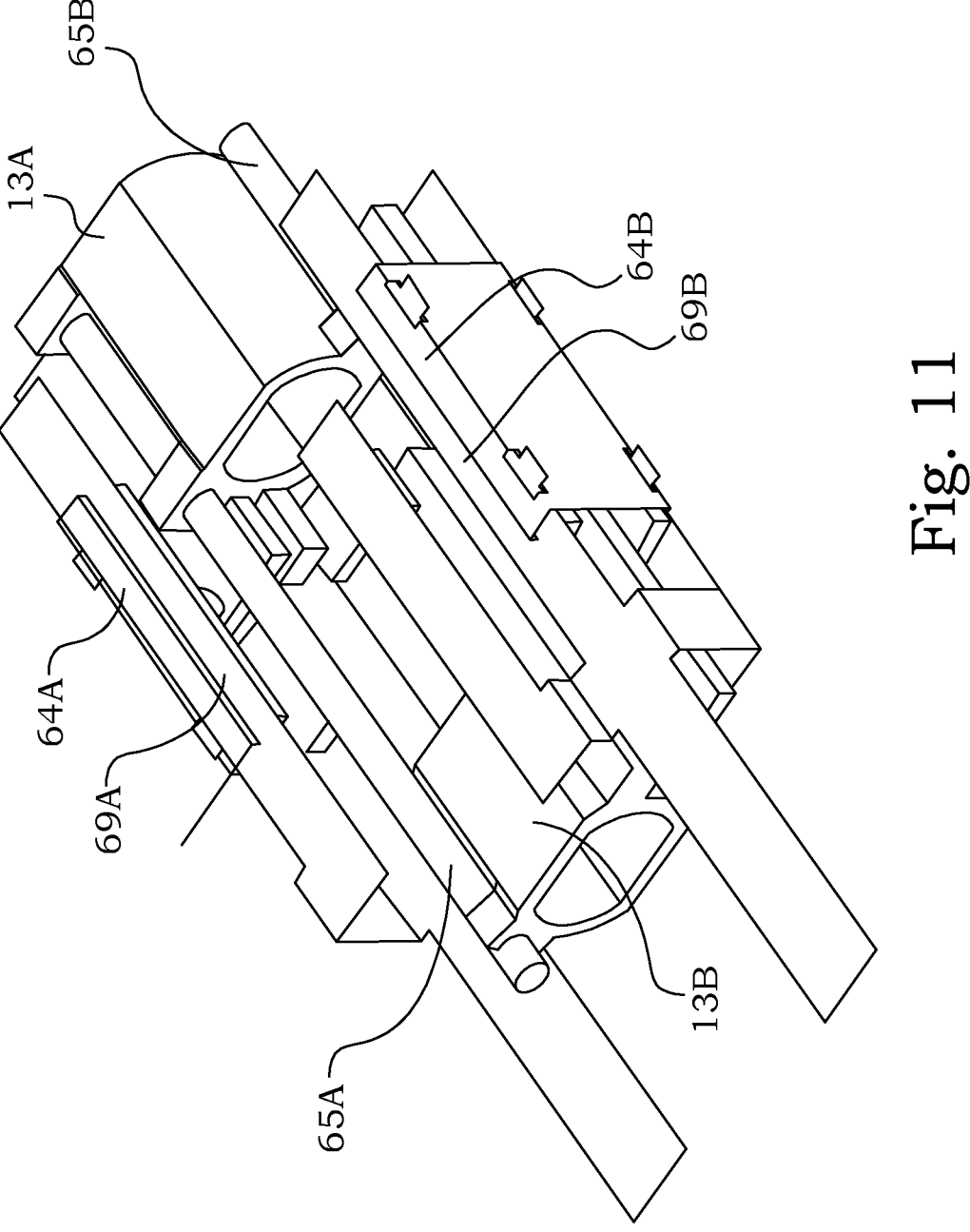
FIG. 11 is a schematic illustration of an embodiment of a motor assembly for an optical lens system.

FIG. 11 illustrates schematically an actuator system based on the embodiments of FIGS. 9 and 10, when assembled. Two lens holders 13A, 13B are mounted to interact with respective actuators 69A and 69B. The lens holders 13A, 13B are thereby movable along two common rods 13A, 13B, parallel to an optical axis of optical lenses provided within the lens holders 13A, 13B. Since the two actuators are to be driven by a common drive unit and are expected to cooperate to provide the requested movements, the driving of the first motor and driving the second motor are preferably performed in a master-slave configuration. The driving unit thus comprises a slave unit configured for driving the first motor and a master unit configured for driving the second motor and for controlling the slave unit.

As for many other piezoelectric actuator systems, the absence of exciting voltage signals will result in that the spring 64A, 64B will clamp the respective drive rod against the drive pads, prohibiting any further relative motion. Therefore, preferably, any voltage signals to the electromechanical materials is removed when the requested positions of the first and second groups of optical lenses, respectively, have been reached. In an apparatus view, the drive unit is preferably configured for removing any voltage signals to the electromechanical materials when the requested positions of the first and second groups of optical lenses, respectively, have been reached.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for driving an optical lens system, said optical lens system comprising a first group of optical lenses movable along a linear path parallel to an optical axis of said optical lenses by a first motor, a second group of optical lenses movable along said linear path by a second motor, and a drive unit, said method comprising the steps of:

reading a present position of said first group of optical lenses along said linear path;

reading a present position of said second group of optical lenses along said linear path;

communicating signals representing said read present positions to said drive unit;

receiving, in said drive unit, a command representing at least one of a requested optical zoom degree and a requested focusing distance, in absolute or relative measures;

deducing, in said drive unit, requested positions of said first and second groups of optical lenses, respectively, corresponding to said received command, by utilizing predetermined lens positioning data available in said drive unit representing positions of said first group of optical lenses and said second group of optical lenses causing different combinations of optical zoom degree and focusing distance;

driving, initiated by said drive unit, said first motor to move said first group of optical lenses from said present position of said first group of optical lenses to said requested position of said first group of optical lenses; and driving, initiated by said drive unit, said second motor, in agreement with said driving of said first motor, to move said second group of optical lenses from said present position of said second group of optical lenses to said requested position of said second group of optical lenses;

said steps of driving said first motor and said second motor, respectively, comprises applying voltage signals over electromechanical materials.

2. The method according to claim 1, wherein said command only comprises a requested optical zoom degree, whereby said step of deducing requested positions of said first and second groups of optical lenses, respectively, comprises:

determining a present focusing distance by comparing said read present positions with said predetermined lens positioning data; and determining said requested positions of said first and second groups of optical lenses, respectively, as positions corresponding to said requested optical zoom degree and said present focusing distance according to said predetermined lens positioning data.

3. The method according to claim 2, wherein said steps of driving said first motor and driving said second motor are performed under a constraint of keeping said focusing distance constant according to said predetermined lens positioning data.

4. The method according to claim 1, wherein said command only comprises a requested focusing distance, whereby said step of deducing requested positions of said first and second groups of optical lenses, respectively, comprises the part steps of:

determining a present optical zoom degree by comparing said read present positions with said predetermined lens positioning data;

determining said requested positions of said first and second groups of optical lenses, respectively, as positions corresponding to said present optical zoom degree and said requested focusing distance according to said predetermined lens positioning data.

5. The method according to claim 4, wherein said steps of driving said first motor and driving said second motor are performed under a constraint of keeping said optical zoom degree constant according to said predetermined lens positioning data.

6. The method according to claim 1, wherein said command comprises both a requested focusing distance and a requested optical zoom degree, whereby said step of deducing requested positions of said first and second groups of optical lenses, respectively, comprises the part step of determining said requested positions of said first and second groups of optical lenses, respectively, as positions corresponding to said requested optical zoom degree and said requested focusing distance according to said predetermined lens positioning data.

7. The method according to claim 6, wherein said command additionally comprises information concerning a requested manner in which the changes in optical zoom degree and focusing distance should be performed, whereby said steps of driving said first motor and driving said second motor are performed under a constraint of changing said optical zoom degree and said focusing distance according to said requested manner.

8. The method according to claim 1, wherein said predetermined lens positioning data comprises data representing different temperatures, wherein said method further comprises:

measuring a temperature representative for said first and second groups of optical lenses; and communicating signals representing said measured temperature to said drive unit;

wherein said step of deducing requested positions of said first and second groups of optical lenses is based on predetermined lens positioning data associated with said measured temperature.

9. The method according to claim 1, wherein said steps of driving said first motor and driving said second motor comprises feed-back operation based on communicated signals representing successive read present positions.

10. The method according to claim 1, wherein said steps of driving said first motor and driving said second motor are performed in a master-slave configuration.

11. The method according to claim 1, wherein the method further includes removing any voltage signals to said electromechanical materials when said requested positions of said first and second groups of optical lenses, respectively, have been reached.

12. The method according to claim 1, wherein the method further includes sending, from said drive unit, information about at least one of a present focusing distance and a present optical zoom degree to a control unit.

13. An optical lens system, comprising:

a first group of optical lenses;

a first motor configured to move said first group of optical lenses along a linear path;

a second group of optical lenses, having a same optical axis as said first group of optical lenses;

a second motor configured to move said second group of optical lenses along said linear path;

said first motor and said second motor are motors driven by applying voltage signals over electromechanical materials, a drive unit configured for operating said first motor and said second motor, a first position sensor arranged to read a position of said first group of optical lenses along said linear path, said first position sensor being connected to said drive unit and configured to provide readings to said drive unit; and a second position sensor arranged to read a position of said second group of optical lenses along said linear path, said second position sensor being connected to said drive unit and configured to provide readings to said drive unit;

wherein said drive unit comprises a data storage comprising predetermined lens positioning data representing positions of said first group of optical lenses and said second group of optical lenses causing different combinations of optical zoom degree and focusing distance;

wherein said drive unit comprises a communication interface for receiving a command representing at least one of a requested optical zoom degree and a requested focusing distance, in absolute or relative measures; and wherein said drive unit is configured for initiating driving said first motor and said second motor to move said first group of optical lenses and said second group of optical lenses, respectively, from an original set of positions of said first group of optical lenses and said second group of optical lenses according to present readings of said first and second position sensors to a requested set of positions of said first group of optical lenses and said second group of optical lenses, said requested set of positions corresponding to said received command according to said predetermined lens positioning data.

14. The optical lens system according to claim 13, wherein said command only comprises a requested optical zoom degree, whereby said drive unit is configured to determine a present focusing distance by comparing said read present positions with said predetermined lens positioning data and to determine said requested positions of said first and second groups of optical lenses, respectively, as positions corresponding to said requested optical zoom degree and said present focusing distance according to said predetermined lens positioning data.

15. The optical lens system according to claim 14, wherein said drive unit is configured for performing said initiating of driving said first motor and said initiating of driving said second motor under a constraint of keeping said focusing distance constant according to said predetermined lens positioning data.

16. The optical lens system according to claim 13, wherein said command only comprises a requested focusing distance, whereby said drive unit is configured to determine a present optical zoom degree by comparing said read present positions with said predetermined lens positioning data and to determine said requested positions of said first and second groups of optical lenses, respectively, as positions corresponding to said present optical zoom degree and said requested focusing distance according to said predetermined lens positioning data.

17. The optical lens system according to claim 16, wherein said drive unit is configured for performing said initiating of driving said first motor and said initiating of driving said second motor under a constraint of keeping said optical zoom degree constant according to said predetermined lens positioning data.

18. The optical lens system according to claim 13, wherein said command comprises both a requested focusing distance and a requested optical zoom degree, whereby said drive unit is configured for determining said requested positions of said first and second groups of optical lenses, respectively, as positions corresponding to said requested optical zoom degree and said requested focusing distance according to said predetermined lens positioning data.

19. The optical lens system according to claim 18, wherein said command additionally comprises information concerning a requested manner in which the changes in optical zoom degree and focusing distance should be performed, whereby said drive unit is configured for initiating driving of said first motor and initiating driving of said second motor under a constraint of changing said optical zoom degree and said focusing distance according to said requested manner.

20. The optical lens system according to claim 13, further comprising a temperature sensor, configured for measuring a temperature representative for said first and second groups of optical lenses, said temperature sensor being connected to said drive unit for enabling communication of signals representing said measured temperature, wherein said predetermined lens positioning data comprises data representing different temperatures, wherein said drive unit is configured for using a requested set of positions corresponding to said received command according to lens positioning data associated with said measured temperature.

21. The optical lens system according to claim 13, wherein said drive unit is configured for initiating said driving of said first motor and initiating said driving of said second motor with a feed-back operation based on communicated signals from said first and second position sensors representing successive read present positions.

22. The optical lens system according to claim 13, wherein said driving unit comprises a slave unit configured for driving said first motor and a master unit configured for driving said second motor and for controlling said slave unit.

23. The optical lens system according to claim 13, wherein said drive unit is configured for removing any voltage signals to said electromechanical materials when said requested positions of said first and second groups of optical lenses, respectively, have been reached.

24. The optical lens system according to claim 13, wherein said communication interface is further configured for sending information about at least one of a present focusing distance and a present optical zoom degree to a control unit.

25. A mobile electronic equipment comprising an optical lens system according to claim 13.

26. The mobile electronic equipment according to claim 25, wherein the mobile electronic equipment comprises an application processor configured to supply said drive unit with said command representing at least one of a requested optical zoom degree and a requested focusing distance.

27. A mobile electronic equipment comprising an optical lens system according to claim 13, wherein:

said communication interface is further configured for sending information about at least one of a present focusing distance and a present optical zoom degree to a control unit;

said control unit is an application processor of said mobile electronic equipment; and said mobile electronic equipment further comprises display means configured for displaying said information about at least one of a present focusing distance and a present optical zoom degree.

* * * * *